United States Patent
Gonzalez et al.

(10) Patent No.: US 6,782,338 B2
(45) Date of Patent: Aug. 24, 2004

(54) APPARATUS AND METHOD FOR CHARACTERIZING GROOVED JOURNALS

(75) Inventors: Stephen G. Gonzalez, Santa Cruz, CA (US); Christopher Rowe Hakes, Felton, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/076,737

(22) Filed: Feb. 14, 2002

(65) Prior Publication Data

US 2003/0083845 A1 May 1, 2003

Related U.S. Application Data (60) Provisional application No. 60/348,905, filed on Oct. 26, 2001.

(51) Int. Cl.$^7$ ............................................. G06F 15/00
(52) U.S. Cl. ..................... 702/155; 384/112
(58) Field of Search .................. 702/155; 384/112, 384/107; 703/192, 1; 360/99, 244; 114/169; 102/232; 74/5.6 D; 82/19

(56) References Cited

U.S. PATENT DOCUMENTS 5,459,674 A * 10/1995 Ide et al. ..................... 703/1
5,678,929 A * 10/1997 Parsoneault et al. ........ 384/112

* cited by examiner

*Primary Examiner*—John Barlow
*Assistant Examiner*—Xiuqin Sun
(74) *Attorney, Agent, or Firm*—Morrison & Foerster LLP (57) ABSTRACT

Embodiments of the invention generally provide a method for characterizing the surface topology of a hydrodynamic bearing used with a disc drive. In one embodiment, the invention provides a method to detect at least one hydrodynamic groove disposed on the hydrodynamic bearing. In another embodiment, the invention provides a method to measure the depth of at least one hydrodynamic groove. In still another aspect, the invention provides a method to establish a ratio between the hydrodynamic groove widths and the spacing between adjacent grooves.

17 Claims, 7 Drawing Sheets

FIG. 7B ferromagnetic fluids. Hydrodynamic bearings spread the bearing interface over a large surface area in comparison with a ball bearing assembly, which comprises a series of point interfaces. This is desirable because the increased bearing surface reduces wobble or run-out between the rotating and fixed members. Further, the use of fluid in the interface area imparts damping effects to the bearing which helps to reduce non-repeat run out.

Another alternative design which has been used with success is a hydrodynamic groove disposed on journals, thrust, and conical hydrodynamic bearings. The hydrodynamic grooves provide a transport mechanism for fluid or air to more evenly distribute fluid pressure within the bearing, and between the rotating surfaces. The shape of the hydrodynamic grooves is dependant on the pressure uniformity desired. For example, a sinusoidal hydrodynamic groove provides a different pressure distribution than a herringbone or helix shaped hydrodynamic groove patterns. The quality of the fluid displacement and therefore the pressure uniformity is generally dependant upon the groove depth and dimensional uniformity. For example, a hydrodynamic groove having a non-uniform depth may lead to pressure differentials and subsequent premature hydrodynamic bearing or journal failure. Generally, to maintain an acceptable hydrodynamic groove shape, a plurality of metrology equipment such as surface analyzers and optical CMM's are used to analyze the hydrodynamic grooves. Typically, to finalize the hydrodynamic groove measurement the bearing and/or journal are often cut apart to expose a cross-sectional view of the hydrodynamic groove for analysis. Unfortunately, the analysis process is very time consuming and subject to subjective decisions of the hydrodynamic groove dimensional errors which may lead to higher disc drive manufacturing costs. Further, the cutting process may damage the hydrodynamic grooves exacerbating analysis errors. Accordingly, due to the analysis uncertainty, the hydrodynamic grooves may be incorrectly characterized which may lead to premature failure of the bearing and/or journal.

Therefore, a need exists for a method and apparatus to provide a reliable and non-invasive method for characterizing hydrodynamic grooves that is efficient and cost effective.

SUMMARY OF THE INVENTION

The invention generally provides a method, and apparatus for characterizing the surface topology of a hydrodynamic bearing. In one embodiment, the invention provides a method of characterizing the topology of one or more hydrodynamic bearing surfaces by rotating the one or more hydrodynamic bearings, then measuring the surfaces of the one or more hydrodynamic bearings. The surface topology is further characterized by determining at least one reference surface and then establishing dimensions of at least one feature disposed on the one or more hydrodynamic bearing surfaces.

In another embodiment, the invention provides a method of analyzing the surface of a hydrodynamic bearing of a disc drive having hydrodynamic grooves by rotating the hydrodynamic bearing along a longitudinal axis and then during rotation, measuring the surface topology of the hydrodynamic bearing. Upon measuring the surface topology, the method determines the angular position of the hydrodynamic grooves along the circumference of the hydrodynamic bearing.

In another embodiment, the invention provides a method for measuring the topology of at least one outer surface of a hydrodynamic bearing disposed about a shaft on a disc

APPARATUS AND METHOD FOR CHARACTERIZING GROOVED JOURNALS

CROSS-REFERENCE TO A RELATED APPLICATION

This invention is based on U.S. Provisional Patent Application Serial No. 60/348,905 filed Oct. 26, 2001, entitled "Characterization of Sinusoidal Grooved Journals (Hydrodynamic Motors)" filed in the name of Christopher Rowe Hakes and Steve G. Gonzalez. The priority of this provisional application is hereby claimed.

BACKGROUND OF THE INVENTION

1. Field of the Invention

The invention relates generally to the field of disc drives, and more particularly to an apparatus and method for providing a reliable characterization of hydrodynamic grooves in a disc drive.

2. Description of the Related Art

Disc drives are capable of storing large amounts of digital data in a relatively small area. Disc drives store information on one or more recording media. The recording media conventionally takes the form of a circular storage disc, e.g., media, having a plurality of concentric circular recording tracks. A typical disc drive has one or more discs for storing information. This information is written to and read from the discs using read/write heads mounted on actuator arms that are moved from track to track across surfaces of the discs by an actuator mechanism.

Generally, the discs are mounted on a spindle that is turned by a spindle motor to pass the surfaces of the discs under the read/write heads. The spindle motor generally includes a shaft fixed to a base plate and a hub, to which the spindle is attached, having a sleeve into which the shaft is inserted. Permanent magnets attached to the hub interact with a stator winding on the base plate to rotate the hub relative to the shaft. In order to facilitate rotation, one or more bearings are usually disposed between the hub and the shaft.

Over the years, storage density has tended to increase and the size of the storage system has tended to decrease. This trend has lead to greater precision and lower tolerance in the manufacturing and operating of magnetic storage discs. For example, to achieve increased storage densities the read/write heads must be placed increasingly close to the surface of the storage disc. This proximity requires that the disc rotate substantially in a single plane. A slight wobble or run-out in disc rotation can cause the surface of the disc to contact the read/write heads. This is known as a "crash" and can damage the read/write heads and surface of the storage disc resulting in loss of data.

From the foregoing discussion, it can be seen that the bearing assembly which supports the storage disc is of critical importance. One typical bearing assembly comprises ball bearings supported between a pair of races which allow a hub of a storage disc to rotate relative to a fixed member. However, ball bearing assemblies have many mechanical problems such as wear, run-out and manufacturing difficulties. Moreover, resistance to operating shock and vibration is poor because of low damping.

One alternative bearing design is a hydrodynamic bearing. In a hydrodynamic bearing, a lubricating fluid such as air or liquid provides a bearing surface between a fixed member of the housing and a rotating member of the disc hub. In addition to air, typical lubricants include oil or drive, comprising a means for measuring the surface topology, and a means for determining the dimensions of features disposed upon the hydrodynamic bearing.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
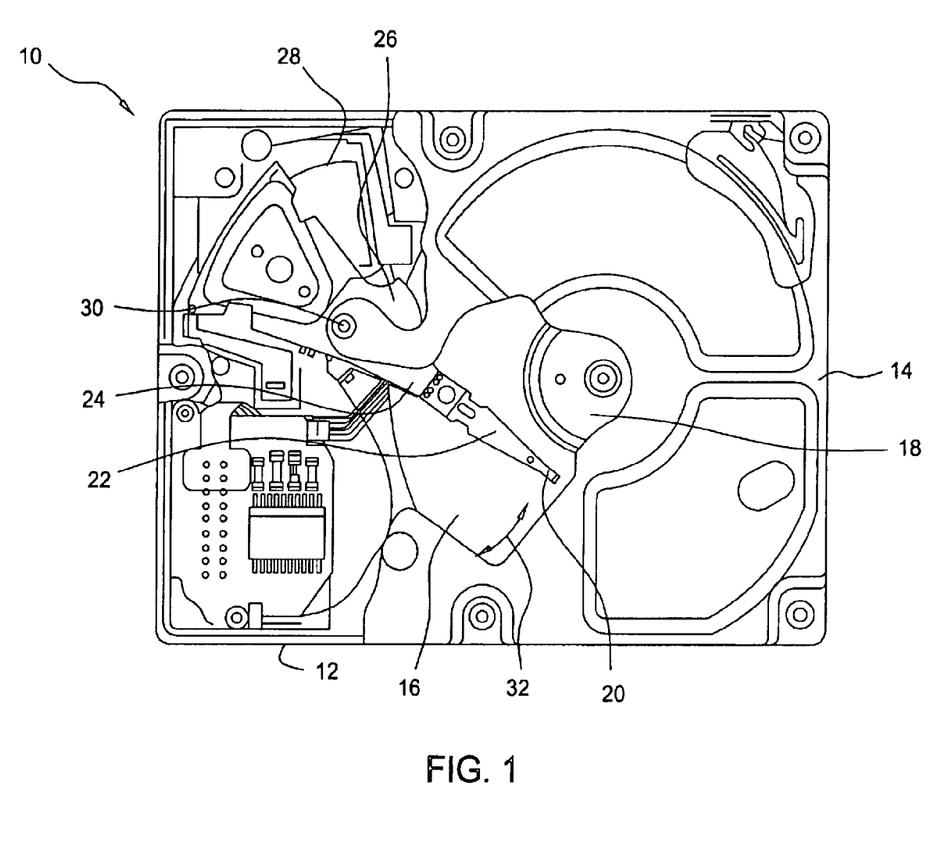
FIG. 1 depicts a plan view of one embodiment of a disc drive for use with aspects of the invention.

FIG. 1 depicts a plan view of one embodiment of a disc drive 10 for use with embodiments of the invention. Referring to FIG. 1, the disc drive 10 includes a housing base 12 and a top cover 14. The housing base 12 is combined with top cover 14 to form a sealed environment to protect the internal components from contamination by elements from outside the sealed environment. The base and top cover arrangement shown in FIG. 1 is well known in the industry. However, other arrangements of the housing components have been frequently used, and aspects of the invention are not limited to the configuration of the disc drive housing. For example, disc drives have been manufactured using a vertical split between two housing members. In such drives, that portion of the housing half which connects to the lower end of the spindle motor is analogous to base 12, while the opposite side of the same housing member, which is connected to or adjacent the top of the spindle motor, is functionally the same as the top cover 14. Disc drive to further includes a disc pack 16 which is mounted for rotation on a spindle motor (not shown) by a disc clamp 18. Disc pack 16 includes a plurality of individual discs that are mounted for co-rotation about a central axis. Each disc surface has an associated read/write head 20 which is mounted to disc drive 10 for communicating with the disc surface. In the example shown in FIG. 1, read/write heads 20 are supported by flexures 22 which are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached read/write heads 20 about a pivot shaft 30 to position read/write heads 20 over a desired data track along a path 32. While a rotary actuator is shown in FIG. 1, the invention may be used with other disc drives having other types of actuators, such as linear actuators.

Figures 2A, 2B:
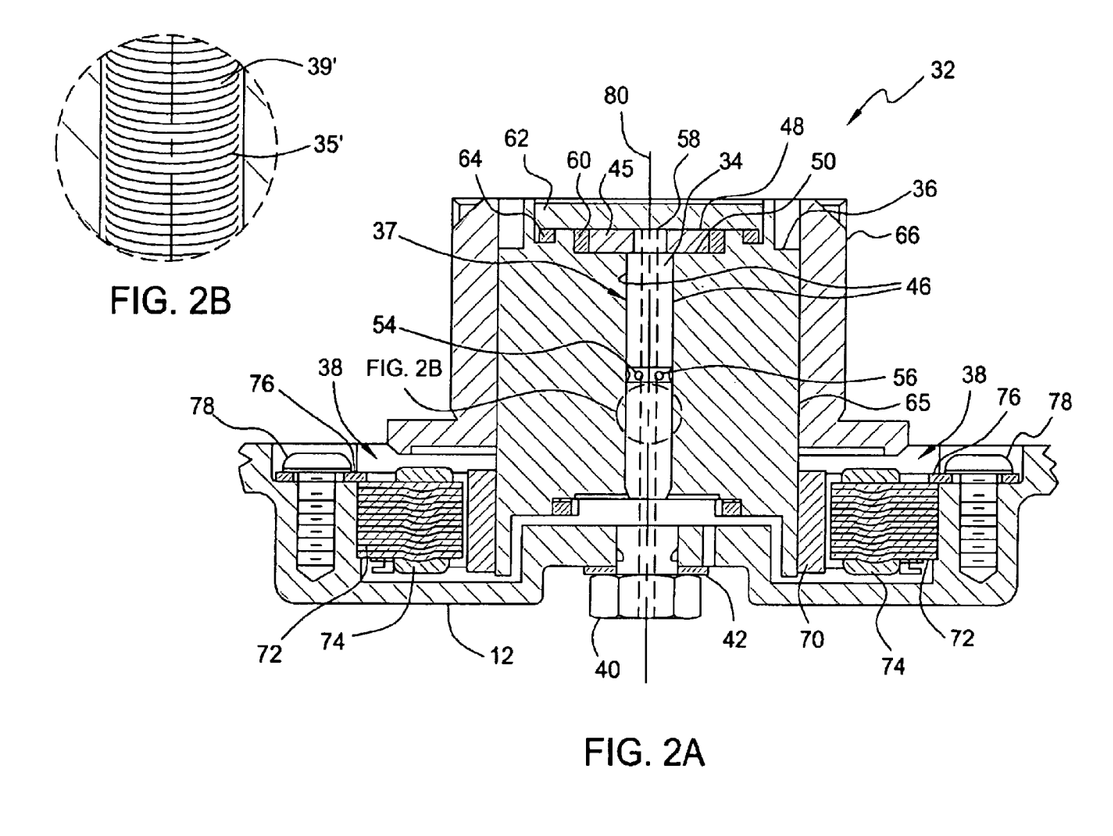
FIG. 2A is a sectional side view depicting one embodiment of a spindle motor for use with aspects of the invention.
FIG. 2B is a partial sectional side view depicting one embodiment of the spindle motor of FIG. 2A.

FIG. 2A is a sectional view of a hydrodynamic bearing spindle motor 32 in accordance with the invention. Spindle motor 32 includes a stationary member 34, a hub 36, and a stator 38. In the embodiment shown in FIG. 2A, the stationary member is a shaft that is fixed and attached to base 12 through a nut 40 and a washer 42. Hub 36 is interconnected with shaft 34 through a hydrodynamic bearing 37 for rotation about shaft 34. Hydrodynamic bearing 37 includes a radial working surface 46 and axial working surfaces 48 and 50. Shaft 34 includes fluid ports 54, 56, and 58 which supply hydrodynamic fluid 60 and assist in circulating the fluid along the working surfaces of the hydrodynamic bearing 37. The hydrodynamic bearing 37 also includes a series of hydrodynamic grooves 35 positioned thereon. The hydrodynamic grooves 35 are adapted to supply and distribute the hydrodynamic fluid 60 to the radial working surfaces 46 of the hydrodynamic bearing 37. The hydrodynamic grooves 35 may be configured any number of ways depending on the hydrodynamic bearing load requirements. For example, the hydrodynamic grooves 35 may include sinusoidal grooves, herringbone grooves, helix grooves, and other similar grooves. The spacing between the hydrodynamic grooves 35 is defined as the "land" 39 which may vary between the hydrodynamic grooves 35 to accommodate various fluid flow requirements. For example, FIG. 2B illustrates a series of sinusoidal hydrodynamic grooves 35' having a land 39' portion between each sinusoidal hydrodynamic groove 35' that approaches a maximum value near the apex of the sinusoidal hydrodynamic grooves 35' to a minimum value near the end of each sinusoidal hydrodynamic grooves 35'. Hydrodynamic fluid 60 is supplied to shaft 34 by a fluid source (not shown), which is coupled to the interior of shaft 34 in a known manner. Spindle motor 32 further includes a thrust bearing 45, which forms the axial working surfaces 48 and 50 of hydrodynamic bearing 37. A counterplate 62 bears against working surface 48 to provide axial stability for the hydrodynamic bearing 37 and to position the hub 36 within spindle motor 32. An O-ring 64 is provided between counterplate 62 and hub 36 to seal the hydrodynamic bearing 37. The seal prevents hydrodynamic fluid 60 from escaping between counterplate 62 and hub 36. Hub 36 includes a central core 65 and a disc carrier member 66 which supports disc pack 16 (shown in FIG. 1) for rotation about shaft 34. Disc pack 16 is held on disc carrier member 66 by disc clamp 18 (also shown in FIG. 1). A permanent magnet 70 is attached to the outer diameter of hub 36, which acts as a rotor for a spindle motor 32. Core 65 is formed of a magnetic material and acts as a back-iron for magnet 70. Rotor magnet 70 can be formed as a unitary, annular ring or can be formed of a plurality of individual magnets which are spaced about the periphery of hub 36. Rotor magnet 70 is magnetized to form one or more magnetic poles. Stator 38 is attached to base 12 and includes a magnetic field focusing member or back-iron 72 and a stator winding 74. Stator winding 74 is attached to back-iron 72 between back-iron 72 and rotor magnet 70. Stator winding 74 is spaced radially from rotor magnet 70 to allow rotor magnet 70 and hub 36 to rotate about a central axis 80. Stator 38 is attached to base 12 through a known method such as one or more C-clamps 76 which are secured to the base through bolts 78. Commutation pulses applied to stator winding 74 generate a rotating magnetic field that communicates with rotor magnet 70 and causes hub 36 to rotate about central axis 80 on bearing 37. In the embodiment shown in FIG. 2A, spindle motor 32 is a "below-hub" type motor in which stator 38 is positioned below hub 36. Stator 38 also has a radial position that is external to hub 36, such that stator winding 74 is secured to an inner diameter surface 82 of back-iron 72.

Figure 3:
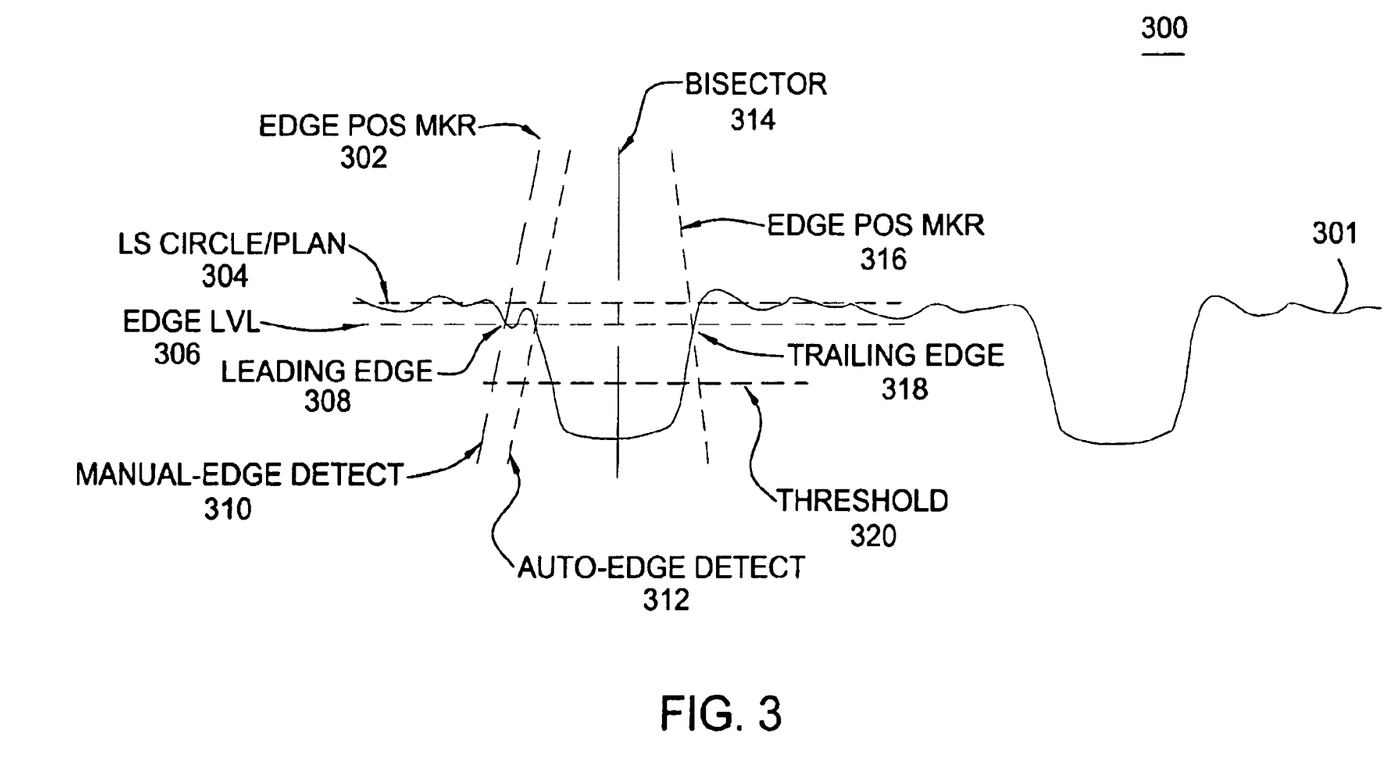
FIG. 3 depicts an output waveform illustrating one embodiment of a surface topography of a hydrodynamic bearing for use with aspects of the invention.
Figure 4:
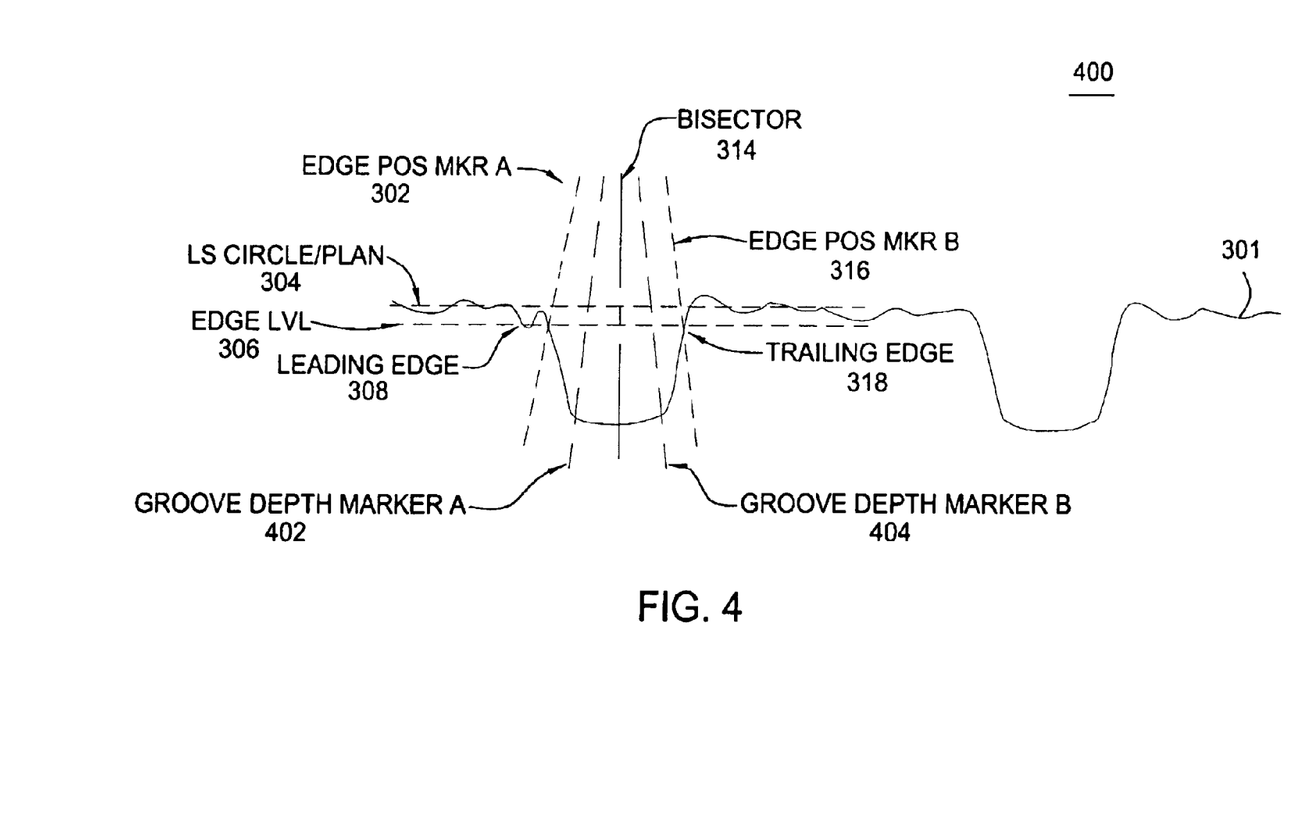
FIG. 4 depicts an output waveform illustrating one embodiment of a surface topology of a hydrodynamic bearing for use with aspects of the invention.
Figure 5:
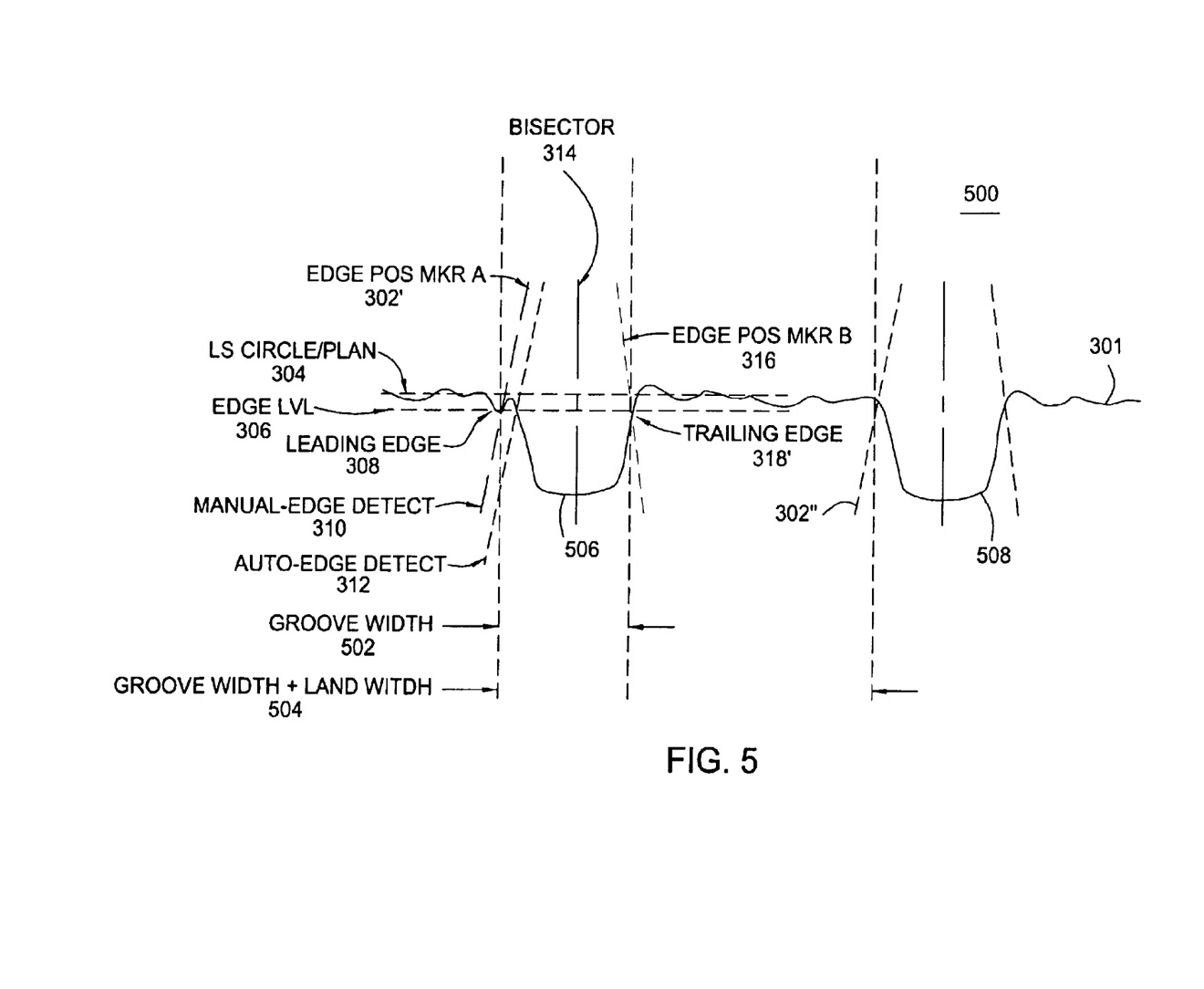
FIG. 5 depicts an output waveform illustrating one embodiment of a surface topology of a hydrodynamic bearing for use with aspects of the invention.

FIGS. 3–5 depict one embodiment of output waveforms 300–500 for a method 600 of determining a surface topography of a hydrodynamic bearing 37 for use with aspects of the invention.

FIGS. 3–5 depict different measurements of an output waveform 301 illustrating a surface topography of a hydrodynamic bearing 37 for use with aspects of the invention. FIG. 3 illustrates one embodiment of a measurement of hydrodynamic groove width. FIG. 4 illustrates one embodiment of a measurement of hydrodynamic groove depth. FIG. 5 illustrates one embodiment of a measurement of the ratio of a width of a hydrodynamic groove 38 to the spacing between adjacent hydrodynamic grooves 38.

Figure 7A:
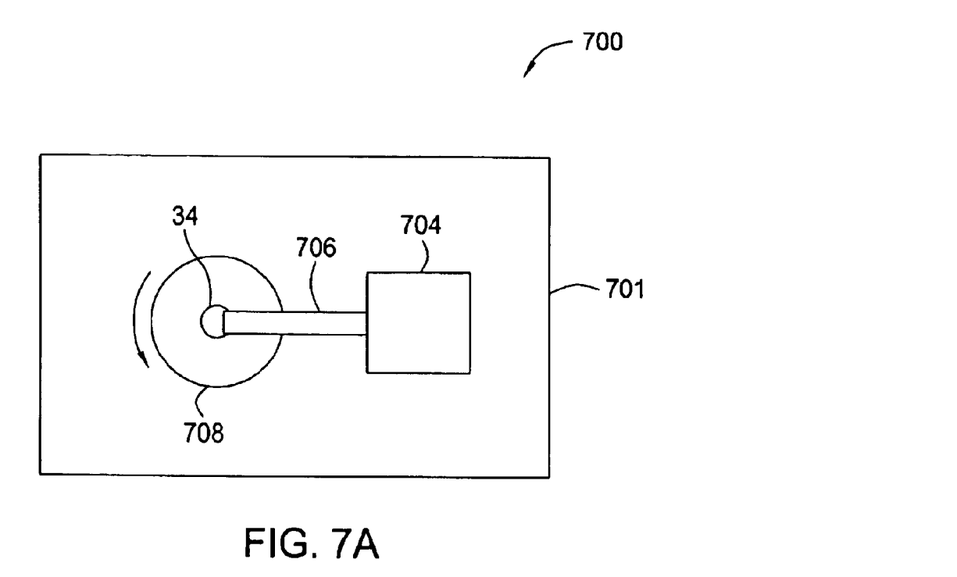
FIG. 7A is a simplified top view illustrating one embodiment of a roundness measuring apparatus for use with aspects of the invention.
Figure 7B:
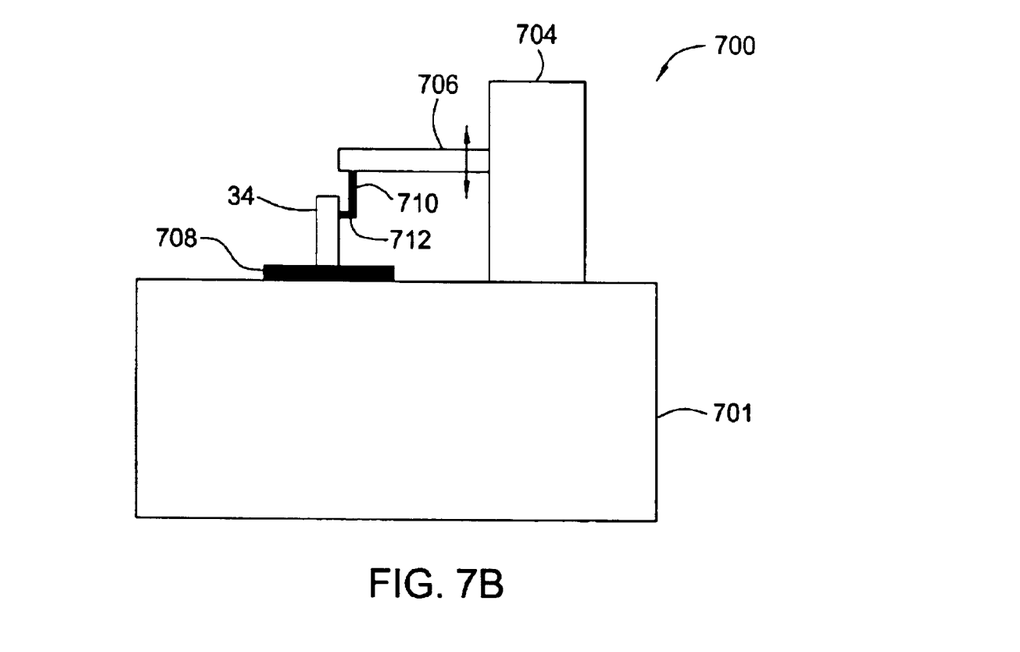
FIG. 7B is a simplified side view illustrating one embodiment of a roundness measuring apparatus for use with aspects of the invention.

In one aspect, a roundness measuring apparatus 700 as illustrated in FIGS. 7A–B may be used to generate a waveform 301. The roundness measuring apparatus 700 is adapted to use a stylus 712 to measure the surface topology of a plurality of parts including hydrodynamic bearings 37. The roundness measuring apparatus 700 includes a plate 708 supported on a rotating drive frame 701. The rotating plate 708 is adapted to rotate objects along an axis such as the longitudinal axis of the hydrodynamic bearings 37. The roundness measuring apparatus 700 also includes a stylus-lifting arm 704 coupled to and adapted to vertically position a stylus-holding member 706 with respect to the rotating plate 708. The stylus-holding member 706 is adapted to position a stylus 710 having a stylus tip 712 disposed on a distal end, against a surface being rotated by the rotating plate 708. For example, to measure the working surfaces 46 and hydrodynamic grooves 35 of a hydrodynamic bearing 37, typically the hydrodynamic bearing 37 is rotated axially about its longitudinal axis by the roundness measuring apparatus 700 on the rotating plate 708. While the hydrodynamic bearing 37 is rotated, the stylus tip 712 is pressed against, for example, the shaft 34. Several well-known measurement techniques, such as induction, detect the motion of the stylus 710 to generate surface profile data that is then transmitted to a processing system (not shown) for data processing and display.

In one aspect of the invention, the data processing system may include a computer or other controller to produce the waveforms such as illustrated in FIGS. 3–5 on an output device such as a computer monitor screen. In general, the data processing system may include a controller, such as programmable logic controller (PLC), computer, or other microprocessor-based controller. The data processing system may include a Central Processing Unit (CPU) in electrical communication with a memory, wherein the memory may contain a roundness measuring program that, when executed by the CPU, provides support for controlling the roundness measuring apparatus. In another aspect of the invention, the data processing system may provide control signals for measuring the topology of the hydrodynamic bearings 37. The roundness-measuring program may conform to any one of a number of different programming languages. For example, the program code can be written in PLC code (e.g., ladder logic), C, C++, BASIC, Pascal, or a number of other languages.

Generally, the waveform 301 is a filtered composite of data obtained by the roundness measuring apparatus. To ensure an accurate surface profile, the data obtained by the roundness measuring apparatus is filtered by the data processing system using well-known digital filtering techniques. As topographic features of the hydrodynamic bearing 37 may be within a micron or less, the vertical scale of the waveform 301 is exaggerated as compared to the actual measurement. The horizontal axis is representative of the number of degrees the hydrodynamic bearing 37 has rotated with respect to an arbitrary reference point.

Figure 6:
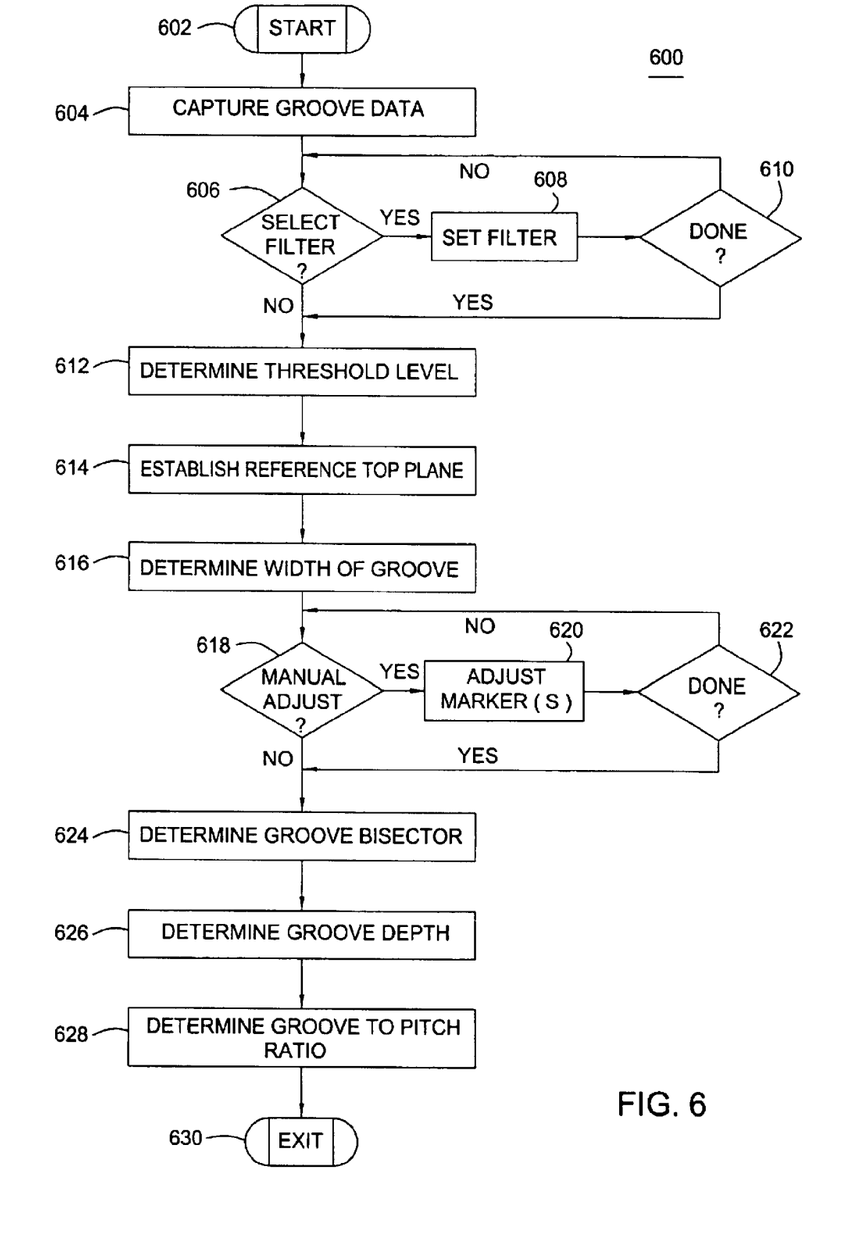
FIG. 6 depicts one embodiment of a method for determining the surface topology of a hydrodynamic bearing for use with aspects of the invention.

FIG. 6 depicts a flow diagram of the method 600 to measure groove width, depth, and spacing as illustrated by FIGS. 3–5. FIGS. 1–5 are referenced as needed with the discussion of FIG. 6. Specifically, the method 600 starts at step 602 when a measurement process is, for example, initiated by a user activating a roundness measuring apparatus to measure the topology of a hydrodynamic bearing 37. At step 604, the roundness measuring apparatus captures the raw polar data from a stylus. At step 606, the method 600 determines the data filtering type, if any is required. If no filtering is required, then the method 600 proceeds to step 612 discussed below. If filtering is required, then a filter is selected at step 608. While the filter may be about a 1–500 upr bandwidth to minimize a raw data noise, other bandwidths are contemplated. Once the filter bandwidth has been selected, the method 600 proceeds to step 612.

As scratches and other perturbations in the hydrodynamic bearing surface may give a false reading, a threshold level is established at step 612. In one embodiment, the filtered groove depth measurements are removed to allow the threshold level to be determined. At step 614, using the threshold level established in step 612, the filtered data is processed using a least squared method such as a least squared circle method, a least squared plane method, or other methods, to establish the average top surface 304 reference of the hydrodynamic bearing 37 waveform profile 301. The least squared plane method is generally more useful for more cylindrical shaped surfaces while the least squared circle method is generally used for conical surfaces. In another aspect of the invention, it is contemplated that the position of the average top surface 304 may be manually adjusted on the display to give a user more control of the average top surface position. Once the average top surface 304 has been established the method 600 then determines the hydrodynamic groove width at step 616. In one aspect, at step 616, to determine the hydrodynamic groove width a selected delta edge level change from the average top surface 304 is used. For example, a measured delta change from the average top surface 304 of about −0.5 micron may be used to stipulate the beginning and ending threshold of a hydrodynamic groove 38. In one aspect, to determine widths of the hydrodynamic grooves 38, the method 600 uses the radius of the average top surface 304 from the longitudinal axis of the hydrodynamic bearing 37 and the measured change in rotation (i.e., degrees of rotation) to calculate the distance from the leading edge 308 of a hydrodynamic groove 38 to its trailing edge 318. Typically, the rotation measurement is with respect to an arbitrary starting point on the hydrodynamic bearing surface. The leading edge 308 and trailing edge 318 may then be marked by a leading edge position marker 302 and a trailing edge marker 316, respectively. In one aspect, once the hydrodynamic groove width have been determined, the user can establish a maximum and minimum hydrodynamic groove width so that measurements outside maximum and minimums can be used to trigger an alarm.

As perturbations such as scratches and other surface imperfections may incorrectly trigger the beginning or ending of hydrodynamic grooves 38, the method 600 may include a manual edge-detect adjustment option to allow a user to move the leading edge position marker 302 from an auto edge-detect position 312 to a manual edge-detect position. For example, as illustrated in FIG. 3, the edge position marker 302 may be manually moved from an auto edge-detect position 312 to a new position 314. At step 618, the method 600 determines if the manual edge-detect adjustment option is selected. If the manual edge-detect adjustment option is selected the method 600 proceeds between steps 618, 620 and 622, to allow the leading edge position marker 302 to be manually moved. Once the edge position marker 302 is no longer being moved, the method 600 proceeds from step 622 to step 624. If the manual edge-detect adjustment option is not selected then the method 600 proceeds to step 624. In another aspect, one or both of the leading edge position marker and trailing edge position marker 302, 318 may be manually adjusted.

In one embodiment, at step 624, a bisector 314 of the hydrodynamic grooves 38 is determined to establish the central angular position of the hydrodynamic grooves 38 with respect to a normalized starting position. The bisector angular position is defined at a point about midway between the leading edge 308 and the trailing edge 318 defined by the leading edge and trailing edge position markers 302, 316.

To calculate the hydrodynamic groove depth, at step 626 the method 600 retrieves a first and second depth from the filtered data within an angular window generally centered about the bisector position. In one aspect, as illustrated in FIG. 4, the angular window is defined by a groove depth marker A 402 and a groove depth marker B 404. In another aspect, the groove depth marker A 402 and the groove depth marker B 404 may be adjusted to expand or contract the angular window. In another aspect, the angular window may be set as a fixed angle and/or as a percentage of the angle enclosed by the leading edge position marker and trailing edge position marker 302, 318. The intersection of the groove depth marker A 402 and the groove depth marker B 404 with the waveform 301 generally defines an average groove depth. In another aspect, scratches and other defects may be deselected by setting the groove depth marker A 402 and the groove depth marker B 404 a specified number of degrees apart and about centered about the bisector 314. In one aspect, once the hydrodynamic groove depth has been determined, the user can establish a maximum and minimum depth so that measurements outside maximum and minimums can be used to trigger an alarm.

At step 628, the method 600 determines the hydrodynamic groove pitch ratio. In one embodiment, the groove pitch ratio is defined by the following formula:

$$\frac{G}{G+L} \quad (1)$$

Where G is defined as the groove width and L is defined as the land width between adjacent hydrodynamic grooves 38. While a ratio of about fifty percent provides exemplar hydrodynamic groove spacing, other ratios are contemplated. In one aspect, the method 600 determines the groove pitch ratio by determining the groove width from step 616.

The method 600 determines the land width by measuring the angular distance between the trailing edge 318 of one hydrodynamic groove 38 to the leading edge 308 of an adjacent hydrodynamic groove 38. For example, as illustrated in FIG. 5, the waveform 301 includes a first groove waveform 506 adjacent a second groove waveform 508. The groove width 502 is defined by the leading edge and trailing edge position of the first groove waveforms 506 using leading and trailing edge position markers 302' and 318', respectively. The hydrodynamic groove width plus the land width (i.e., G+L) 504 is defined by the angular distance between the leading edge position marker 302' of the first groove waveform 506 to the leading edge position marker 302" of the second hydrodynamic groove waveform 508. In one aspect, once the groove pitch ratio has been determined, the user can establish a maximum and minimum hydrodynamic groove pitch ratio so that measurements outside maximum and minimums can be used to trigger an alarm. Subsequently, the method 600 exits at step 630.

While the foregoing is directed to embodiments of the invention, other and further embodiments of the invention may be devised without departing from the basic scope thereof, and the scope thereof is determined by the claims that follow.

What is claimed is:

1. A method for characterizing the topology of one or more hydrodynamic bearing surfaces, comprising;
   rotating the one or more hydrodynamic bearings;
   measuring the surface of the one or more hydrodynamic beatings;
   determining at least one reference plane; and
   establishing at least one dimension of at least one groove disposed on the one or more hydrodynamic bearing surfaces, including determining a ratio of a width of at least one hydrodynamic groove to the distance between the at least one hydrodynamic groove and at least one adjacent hydrodynamic groove.

2. A method for characterizing the topology of one or more hydrodynamic bearing surfaces, comprising;
   rotating the one or more hydrodynamic bearings;
   measuring the surface of the one or more hydrodynamic bearings;
   determining at least one reference plane; and
   establishing at least one dimension of at least one groove disposed on the one or more hydrodynamic bearing surfaces, including determining at least one of a width, a depth, and a position of the at least one hydrodynamic groove with respect to the at least one reference plane.

3. A method for characterizing the topology of one or more hydrodynamic bearing surfaces, comprising;
   rotating the one or more hydrodynamic bearings;
   measuring the surface of the one or more hydrodynamic bearings;
   determining at least one reference plane; and
   establishing at least one dimension of at least one groove disposed on the one or more hydrodynamic bearing surfaces, including establishing the dimensions of at least one feature including determining the reference plane from data acquired during the measuring of the surface of the one or more hydrodynamic bearings and establishing the dimensions of the at least one feature, including establishing a distance from the reference plane wherein the distance defines a leading edge or trailing edge of at least one hydrodynamic groove.

4. A method for analyzing the surface of a hydrodynamic bearing of a disc drive having hydrodynamic grooves, comprising:

rotating the hydrodynamic bearing about longitudinal axis;

during rotation, measuring the surface topology of the hydrodynamic bearing; and determining the angular position of the hydrodynamic grooves along the circumference of the hydrodynamic bearing with respect to the longitudinal axis.

5. The method of claim 4, further comprising determining at least one of a depth dimension and a width dimension of the hydrodynamic grooves.

6. The method of claim 4, further comprising determining the ratio of a width dimension of a first hydrodynamic groove to an angular distance between one or more hydrodynamic grooves adjacent the first hydrodynamic groove.

7. The method of claim 4, wherein the hydrodynamic grooves comprise sinusoidal hydrodynamic grooves, herringbone hydrodynamic grooves, helix hydrodynamic grooves, and combinations thereof.

8. The method of claim 4, wherein measuring the surface topology of the hydrodynamic bearing comprises determining at least one edge of the hydrodynamic grooves.

9. The method of claim 8, wherein determining at least one edge of the hydrodynamic grooves comprises establishing a least squares reference plane associated with data derived during measuring, then providing a user defined distance from the least squares reference plane defining the upper boundary of the at least one edge of the hydrodynamic grooves.

10. The method of claim 4, wherein determining the angular position of the hydrodynamic grooves comprises defining a bisector of a measured width distance for the hydrodynamic grooves as a position about midway the measured width distance.

11. The method of claim 10, further comprises determining a depth of the hydrodynamic grooves wherein the depth is defined as the distance from a reference plane to at least two points intersecting the edge of the hydrodynamic grooves about equidistant from the longitudinal axis and about centered about the bisector.

12. Apparatus for measuring the topology of at least one surface of a hydrodynamic bearing disposed about a shaft on a disc drive, comprising:

means for determining the dimensions of features disposed upon the surface, wherein the features include at least one hydrodynamic groove, and means for determining at least one of a width, a depth, and a position of the at least one hydrodynamic groove with respect to at least one reference plane.

13. The apparatus of claim 12, wherein means for measuring the surface topology comprises a rotating means for rotating the hydrodynamic bearing about a longitudinal axis and a surface measuring means for measuring the surface topology.

14. The apparatus of claim 12, surface measuring means comprises an edge-detecting means for analyzing the data to determine at least one edge of at least one hydrodynamic groove disposed on the hydrodynamic bearing.

15. The apparatus of claim 12, wherein means for determining the dimensions of features comprises data processing means for processing data received from measuring the surface topology and an edge-detecting means for analyzing the data to determine at least one edge of at least one hydrodynamic groove disposed on the hydrodynamic bearing.

16. The apparatus of claim 12, including means for determining a radio of a width of at least one hydrodynamic groove to the distance between the at least one hydrodynamic groove and at least one adjacent hydrodynamic groove.

17. The apparatus of claim 12, including means for establishing the dimensions of at least one feature comprises determining the reference plane from data acquired during the measuring of the surface of the one or more hydrodynamic bearings and establishing the dimensions of the at least one feature comprises establishing a distance from the reference plane wherein the distance defines a leading edge or trailing edge of at least one hydrodynamic groove.

* * * * *